(No Model.)
I. W. LORD.
FRUIT PICKER.
No. 496,520. Patented May 2, 1893.
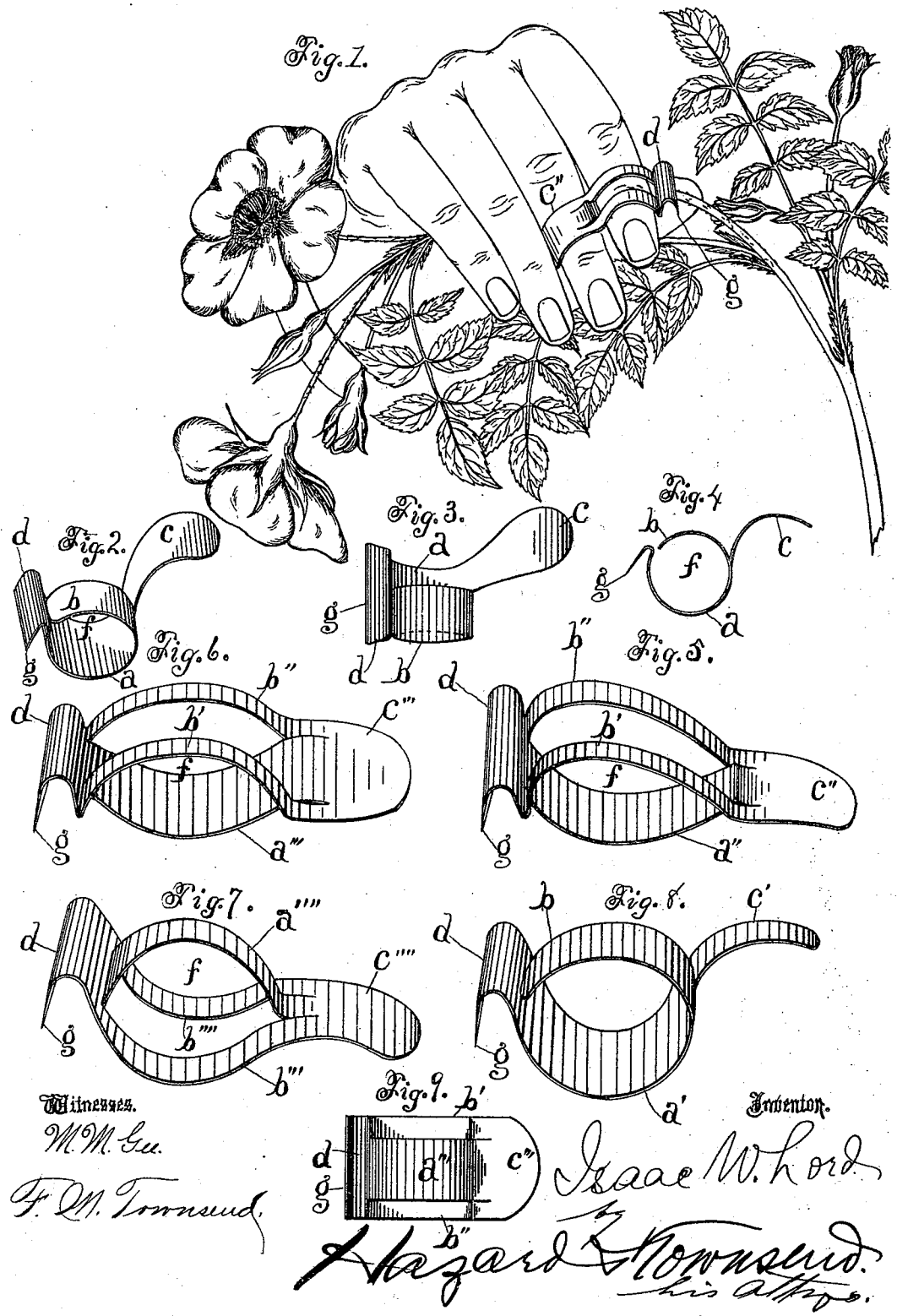
Witnesses.
M. M. Gu.
F. M. Townsend.
Inventor.
Isaac W. Lord
by Hazard Townsend
his atty.
THE NORRIS PETERS CO., PHOTO-LITHO., WASHINGTON, D. C.

UNITED STATES PATENT OFFICE.

ISAAC W. LORD, OF CUCAMONGA, CALIFORNIA.

FRUIT-PICKER.

SPECIFICATION forming part of Letters Patent No. 496,520, dated May 2, 1893.

Application filed June 9, 1892. Serial No. 436,049. (No model.)

*To all whom it may concern:*

Be it known that I, ISAAC W. LORD, a citizen of the United States, residing at Cucamonga, in the county of San Bernardino and State of California, have invented a new and useful Improvement in Fruit-Pickers, of which the following is a specification.

My invention relates to fruit pickers adapted to be secured to the fingers of the operator and provided with a suitable blade for cutting the stem of the fruit.

My invention is also adapted for picking flowers, &c.

My invention relates to that class of fruit pickers formed of a thin blade of metal adapted for attachment to the fingers and provided at one end with a cutting edge and consists in the peculiar form of construction of the same as described herein and shown in the accompanying drawings.

The object of my invention is to provide a fruit picker which is adapted to be firmly secured to the fingers in the position best adapted to allow perfect freedom of movement of the hand in picking the fruit or flowers and to allow the hand to grasp the fruit or flower or the stem thereof at the time of picking so that the work can be more conveniently done with one hand only. Also to so construct the instrument that it will the more naturally assume a comfortable position.

A special feature of my invention is the arrangement and construction of parts whereby the cutting edge is brought into position to allow the most convenient use of the thumb to assist in severing the stem by pressing it against the blade while the thumb is in position also to hold the stem between itself and the fore-finger.

In the accompanying drawings, Figure 1 is a perspective view of one form of my improved fruit picker applied to the fingers of a hand which is shown in the act of picking a flower. Fig. 2 shows the preferred form of picker detached. Figs. 3 and 4 are respectively plan and side views of the same. Figs. 5, 6, 7 and 8 show various modifications of form. Fig. 9 is a plan view of the form shown in Fig. 6 looking toward the cutting edge.

My improved fruit picker comprises an integral blade or strip of metal having one end bent into a cutting blade having its plane transverse the axis of the main blade or body of the implement and provided at the end thereof with a cutting edge and having its other end provided with a finger rest adapted to rest upon the second finger of the hand, and having a loop or loops integral with the strip arranged intermediate the finger rest and the transverse blade, to form an adjustable spring clasp adapted to clasp the fore finger of the hand.

Figs. 2, 3, 4 and 8 illustrate the simplest forms of construction and Figs. 2, 3 and 4 show the shape I prefer. This form is made by slitting the metal strip at the end opposite the blade and bending one tongue over to form the bend or loop for the finger socket or clasp while the other tongue is curved to fit upon the top of the finger adjacent that placed in the socket clasp and clasped by such clasp.

$a$ indicates the body portion of the implement.

$b$ indicates the tongue portion which is bent over to form the upper portion of the spring clasp loop or socket which is to receive the finger.

$c$ indicates the finger rest which is curved to fit upon the top of the finger adjacent that which is inserted in the spring clasp socket or loop $f$.

$d$ indicates the knife portion of the instrument which is bent into U shape and has its plane transverse the axis of the main blade or body $a$ and is bent into U shape with relation to such body and is provided with the cutting edge $g$. The tail piece or finger rest $c$ is arranged to extend forward from the main axis of the instrument so that it will rest upon the finger without resting upon the knuckle of the finger as hereinafter set forth.

The main body of the implement as shown in Figs. 1, 5, 6, 7 and 9 consists of a metal strip slit longitudinally intermediate its ends to form the three socket or finger clasping strips $a''$, $b'$ and $b''$ (&c.) which are bent apart to form a finger clasping socket $f$ between them, the middle strip $a''$ (&c.) being bent in one direction and the side strips $b'$ $b''$ (&c.) being bent in the other direction. One extremity $c''$ (&c.) of the metal strip is arranged to form the finger rest to rest upon the top of the second finger of the hand of the operator as shown in Fig. 1. The other extremity $d$ is bent into U shape and its end is arranged straight transverse the axis of the strip as shown in Fig. 6 and sharpened to form the cutting edge.

The instruments shown in the several Figs. 5, 6 and 7 differ from each other simply in the shape of the strips formed by means of the slits, and the form into which the strips are bent.

Fig. 8 shows a modified form in which the end of the metal strip is split to form the two members $c'$ and $b$ but in which the member $c'$ does not project forward as in the preferred form.

In all the forms shown in Figs. 1, 5, 6, 7 and 9, the slits extend into the tail piece or finger rest $c''$ (&c.) thus affording a spring or flexibility for the finger socket clasp $f$ so that the members can be conveniently spread apart to allow the insertion of the finger and will gently and firmly grasp the inserted finger at all times.

In the drawings the reference letters referring to similar parts which are slightly different in their construction and arrangement are distinguished from each other by indices.

In practice the implement is placed upon the hand (the fore-finger being inserted in the socket $f$) and the tail piece $c$ is set to rest upon the second finger of the hand. This brings the edge of the U shaped portion $d$ into the position indicated in Fig. 1, where it is most convenient for the thumb to be pressed against it. The fruit, flower, &c., to be plucked is then grasped in the hand with the ball of the thumb pressing the stem toward the finger thus bringing the stem into contact therewith as well as with the edge $g$ of the blade. The pressure of the thumb or a twist of the hand will cause the blade to sever the stem, leaving the fruit or flower in the hand.

In the operation of picking the fruit or flower the finger adjacent that inserted in the clasp socket $f$ naturally projects forward beyond the end of the finger inserted in such socket.

By the construction shown in Figs. 3 and 8 the finger rest is brought into proper engagement with such adjacent finger between the knuckles thereof when such finger is closed to grasp the stem or fruit. This is especially true with the form shown in Fig. 3.

In the other forms shown, the finger rest $c''$ (&c.) is liable to rest upon the knuckle of the adjacent finger when such finger is closed to grasp the stem.

It is essential that the spring clasp be arranged intermediate the blade and the finger rest in order that the knife will be securely held in its proper position upon the hand.

It has been suggested to provide a fruit picker's knife with a clasp at one end and a blade at the other end and finger rests intermediate, but such construction fails to secure the object of my invention as it leaves that end of the knife upon which the strain is brought to bear, unsecured to the hand except by the pressure of the fingers, while with my form, in which the clasp is intermediate the finger rest and the knife blade, the portion of the knife upon which the strain comes directly is fixed upon the finger.

Now, having described my invention, what I claim as new, and desire to secure by Letters Patent, is—

1. The fruit picker set forth comprising the integral blade or strip of metal having one end formed into a cutting blade having its plane transverse the axis of the main blade or body of the implement and provided at the end thereof with a cutting edge, and having its other end provided with a finger rest adapted to rest upon the second finger of the hand and having an adjustable spring clasp integral with the strip arranged intermediate the finger rest and the transverse blade to receive and clasp the fore-finger of the hand.

2. The fruit picker set forth comprising the integral strip of metal having one end formed into a cutting blade having its plane transverse the axis of the main blade or body of the implement and having its other end slit and one tongue bent over to form the bend or loop for the finger socket, and the other tongue curved to fit the top of the finger adjacent that placed in the socket.

3. The fruit picker set forth comprising the integral strip of metal having one end formed into a cutting blade having its plane transverse the axis of the main blade or body of the implement and having its other end slit and one tongue bent over to form the bend or loop for the finger socket, and the other tongue curved to fit upon the top of the finger adjacent that placed in the socket and arranged to extend forward from the main axis of the instrument substantially as and for the purpose set forth.

ISAAC W. LORD.

Witnesses:
JAMES R. TOWNSEND,
ALFRED I. TOWNSEND.